Dec. 2, 1924.  1,518,032

F. A. WENMAN

FINDER

Filed June 21, 1922　　3 Sheets-Sheet 1

WITNESSES

INVENTOR
Frederick A. Wenman
BY
ATTORNEYS

Dec. 2, 1924.

F. A. WENMAN

FINDER

Filed June 21, 1922

WITNESSES
Frederick Diehl.

INVENTOR
Frederick A. Wenman
BY
ATTORNEYS

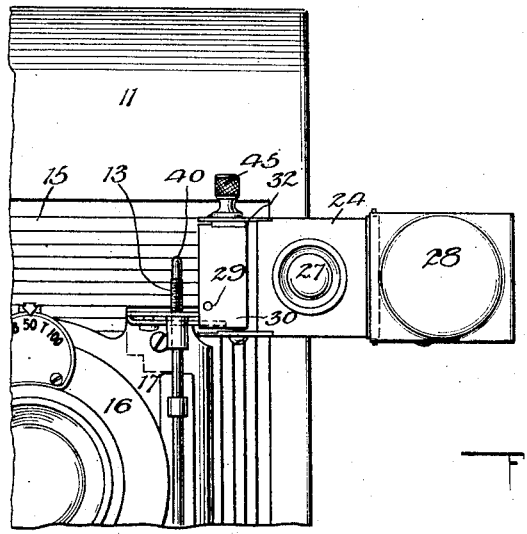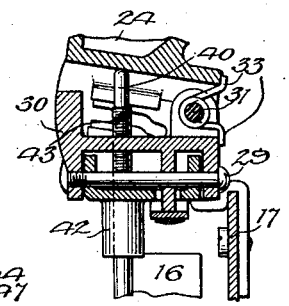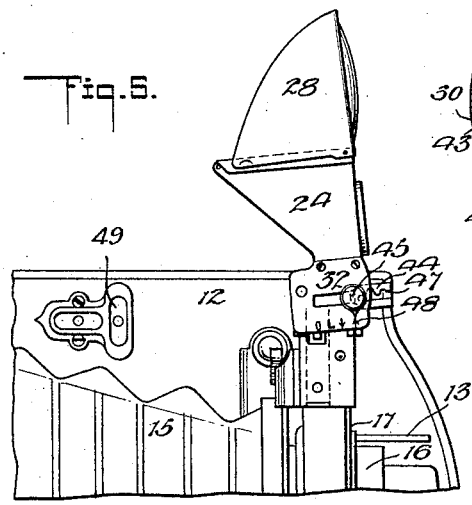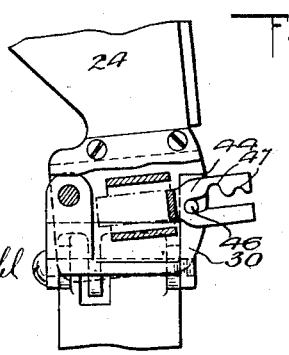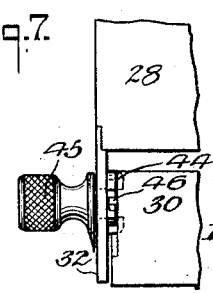

Patented Dec. 2, 1924.

1,518,032

UNITED STATES PATENT OFFICE.

FREDERICK A. WENMAN, OF BROOKLYN, NEW YORK.

FINDER.

Application filed June 21, 1922. Serial No. 569,839.

*To all whom it may concern:*

Be it known that I, FREDERICK A. WENMAN, a citizen of the United States, and resident of the city of New York, borough of Brooklyn, in the county of Kings and State of New York, have invented a new and Improved Finder, of which the following is a full, clear, and exact description.

My invention relates to a finder particularly applicable to cameras, although not necessarily limited to this application, and my present invention aims particularly to provide improved construction over my prior Patent #1,406,124 issued February 7, 1922, so that certain new and useful results will be achieved over the construction disclosed in this patent.

The present device, similar to my previous construction is intended for the purpose of providing a finder which is primarily to be associated with a camera and by means of which an operator may make an exposure of a tall building or similar object at a relatively short distance without any danger of the exposure presenting the object as tilting away from or towards the camera. This result is achieved by the movement of the shutter block, in a direction parallel to the object to be photographed, and either above or below a horizontal plane, according to whether the object is below or above the operator. This mechanism forms a standard part of usual camera construction and my invention resides more particularly in the provision of a finder which may be adjusted to embrace a certain field of vision, and the adjustment of the camera parts to the proper position, to also embrace the objects shown in the finder.

I have found in use that the finder constructed in accordance with my previous application, although extremely desirable in most instances, offers objection in that an inexperienced operator has difficulty in extending the function and co-operation of the parts. Thus it is necessary in this previous structure to actuate the finder mechanism so that the finder will embrace the object to be photographed. Subsequent it is necessary to read the indicator and finally the shutter block must be adjusted to a corresponding position. Also in certain instances, due to the fact that the finder is carried by the shutter block and moves therewith to correct slightly the position of the finder, and subsequently to correct the position of the block.

Thus it is an object of the present invention to provide a finder mechanism particularly intended for use in connection with cameras and by means of which the parts will automatically be set to their proper position upon the finder being adjusted to embrace the "field" which is to be photographed.

A further object of my present invention is that of constructing a device of the character stated in which no correcting of the position of the parts will be necessary so that, in other words, an operator upon once moving the finder to include the desired object, it will only be necessary for him to make an exposure, and he may be assured that all of the parts embraced in the full field of the finder will be included in this exposure, and that these parts will appear in the same manner as they appear reflected in the finder.

Thus a mechanism is produced which is extremely simple in operation, and by means of which an utterly inexperienced person is capable of achieving extremely desirable results, aside from the fact that it will be impossible for an operator to produce a poor or unexpected result incident to becoming confused with the operation and mechanism.

The finder embracing my present construction and associated with a camera is particularly adapted for use in connection with a device of this type, which employs a roll of films. In other words, in a plate camera or a type of camera in which the field to be photographed is visible upon the ground glass, the lens block may readily be adjusted so that exact results may be procured. However in a film camera of the usual construction this result is incapable of accomplishment, and thus the present finder, in view of the fact that it embraces exactly the same field of vision as is included by the negative, and shows the image in exactly the same manner as it would appear upon the negative exact and perfect results may be achieved.

With these and further objects in mind my present invention has reference particularly to a finder which is preferably of conventional construction, as well as a camera with which the finder is associated, this camera being of the usual type now placed upon the market, and known as a "folding pocket camera", together with mechanism which will co-ordinate the movement of the shutter block and finder.

Reference is had to the attached sheets of drawings as illustrating a practical embodiment of my invention, and it will be seen in these drawings that;

Figure 4 is a fragmentary front view of a portion of a camera and the mechanism for actuating the finder, said finder being arranged in lateral position.

Figure 5 is a plan view of the parts as shown in Figure 4.

Figure 6 is a fragmentary enlarged view of a portion of the mechanism afore-referred to.

Figure 7 is an end view thereof, and

Figure 8 is an enlarged sectional view taken along the line 8—8 and in the direction of the arrows indicated in Figure 2.

Figure 1:
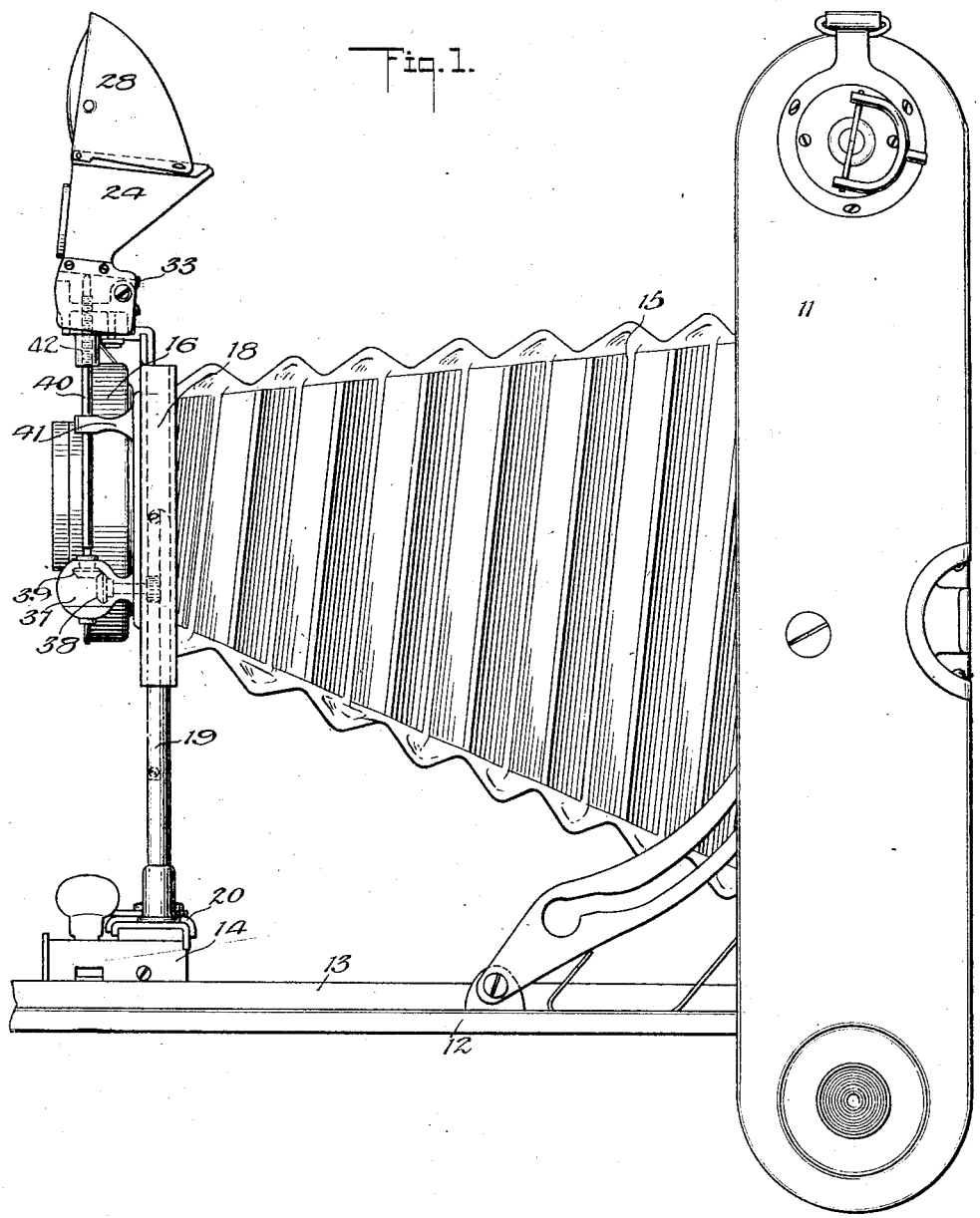
Figure 1 is a side elevation of a conventional form of camera and finder, together with mechanism which will produce the result desired.
Figure 2:
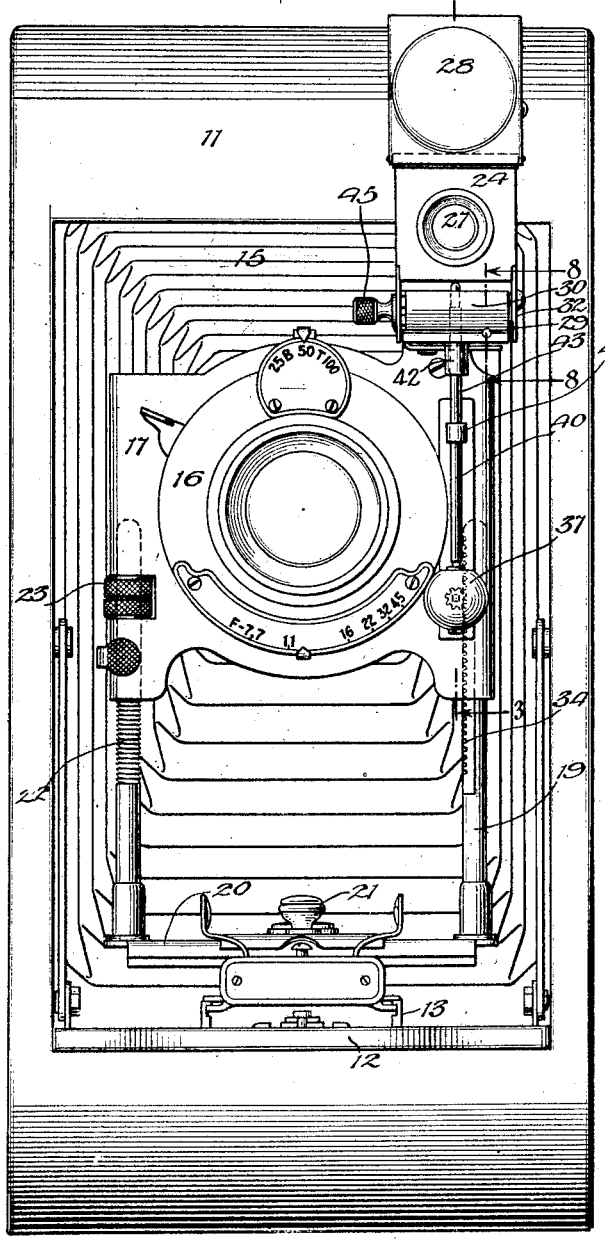
Figure 2 is a front view of the device as shown in Figure 1.

It will be seen in these views that the reference numeral 11 indicates a conventional camera body, to which a base 12 is hingedly attached, the latter carrying tracks 13 mounting the traveler 14, and a bellows 15 is also provided which, when the parts of the camera are unfolded, extends between the body 11 and the shutter or lens block 16.

Also in accordance with conventional construction an adjustable mounting for the block 16 is provided by utilizing a plate 17 which is fixedly attached to the block 16, and provides sleeves 18 adjacent its edge portions which sleeves slidably embrace columns 19, the latter being supported by a table 20 which is transversely movable of the traveler 14 although normally retained fixed with respect to the same by suitable securing means 21.

By the last named construction which is common to virtually all types of cameras, a transverse shifting of the block 16 with respect to the camera parts is effected, and also in accordance with the conventional construction, one of the columns 19 may be screw threaded as at 22, these threads being engaged by the nut 23 carried in a cut out portion formed at one of the edges of the plate 17. Thus if it is desired to adjust the block 16 with respect to the camera, this effect may be secured by simply rotating the nut 23 to thus force the plate 17 and the block carried thereby longitudinally of the columns 19.

Figure 3:
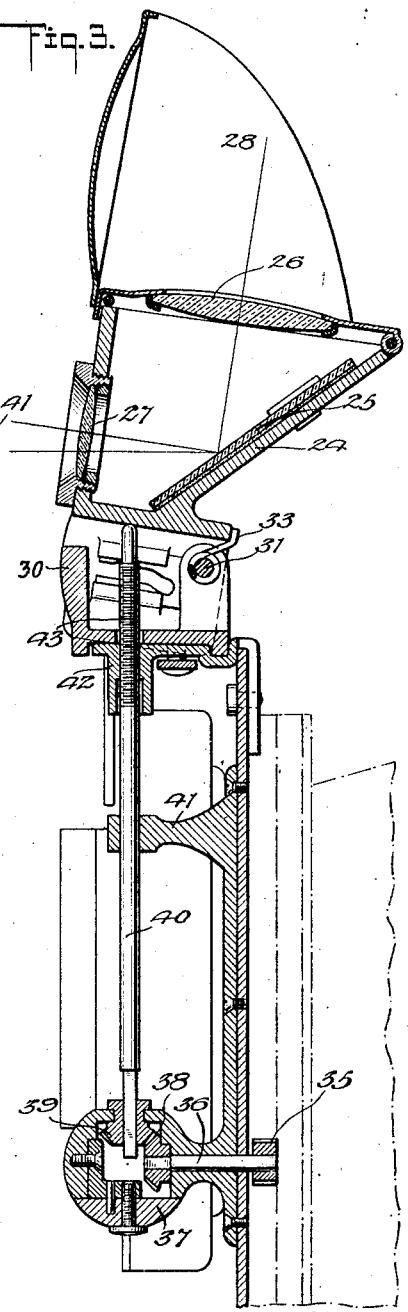
Figure 3 is an enlarged sectional view taken along the line 3—3 and in the direction of the arrows indicated in Figure 2.

The foregoing is conventional construction and I wish it understood that the same forms no part of my invention, the same being also true of the finder best shown in Figure 3, which finder may embrace a body 24 within which an angularly disposed reflecting element 25 is provided, the latter being viewed through a transparent element 26, and the rays being reflected onto the same through a lens 27, the said transparent element 26 being shielded by a cover 28 which is movably carried by the body 24.

However, contrary to the usual construction it will be noted that, in addition to the fact that the body 24 is capable of transversely swinging with respect to the camera body by the provision of the pin 29, the same is also longitudinally movable of the said camera. This latter movement is permitted by virtue of the fact that the pin 29 is supported by parts associated with the block 16, and this pin extends through the base 30 directly carrying the finder and a connection permitting of a movement of the finder proper with respect to the base 30 is provided in the manner aforestated by means of a second pin 31 extending transversely through the base 30 and extensions 32 forming a part of the finder proper. However the finder proper, or in other words, the body of the same is held normally immovable with respect to the base 30 by any suitable means such as a spring 33 associated with the pin, which spring, as in Figure 8 has one of its ends co-operating with the rear edge of the finder proper, its opposite end co-operating with or bearing against the said base.

It is also to be noted that contrary to conventional construction, one of the columns 19 carries or presents a serrated rack 34, and a gear 35 has its teeth operatively engaging this rack, it being seen as in Figure 3 that the gear is carried upon a shaft 36 in turn supported by a housing 37. Within the housing a beveled gear 38 is provided, which gear is carried by the inner end of the shaft 36 and a second gear 39 is carried by a second shaft 40, and thus upon the shaft 36 being turned the second shaft 40 will be correspondingly rotated incident to the interengagement of the gears 38 and 39. However, attention being again invited to Figure 3 it will be noted that the shaft 40 is capable of sliding movement with respect to the gear 39 and the body of the shaft is rotatably supported by a trunnion 41 while the upper end of the same extends through a screw threaded collar 42 attached to the plate 17 and is formed with corresponding screw threads 43 at this point, while its upper end bears against the underside of the finder proper at a point beyond the pin 31.

Thus in operation it will be understood assuming that an object is to be photographed at a relatively short range which object extends or lies in a plane far beyond the horizontal plane in which the operator stands, the said operator may position the camera so that the same is as nearly level as possible, this result being achieved by the use of any desirable type of leveling device which the operator may employ, such as for instance the spirit level 49 shown in Figure 5. The operator now moves the block 16 by any suitable means such as the mechanism shown with respect to the columns 19 and in the interim views the field visible within the finder.

This latter member will obviously also be moved incident to the fact that it is supported by the plate 17, but it will also be moved additionally, or in other words with respect to the said plate. This action is caused by the fact that the plate moves along the columns 19, carrying with it the housing 37 and the gear 35, and the latter, meshing with the teeth of the serrated portion 34 will be rotated. This rotation will be transmitted to the shaft 40, and the latter will be projected or retracted to a greater or less extent according to the amount of movement of the plate with respect to its supporting columns. Also incident to this projection, and due to the fact that the same bears against the underside of the finder proper, the latter will be swung around the pin 31, as has been indicated in Figure 3.

This operation will occur simultaneously with the movement of the block with respect to the columns, and thus an operator is enabled to adjust the plate 17 and the parts carried thereby, and to continue this adjustment while he views the field visible within the finder, until such time as those parts to be included in the exposure are visible in this field, it being of course obvious that the parts are so proportioned and adjusted that the finder movement will always correspond to the degree of movement of the shutter block to cause the camera to embrace a field corresponding identical to the field embraced by the sensitized element within the camera.

Thus the objects of this invention are accomplished, and it will be understood that the mechanism herewith shown and described is adapted to numerous uses and associations, and with a view of presenting a complete device which will enable an operator to accomplish a desirable result when the camera has been placed upon its side to include a broader field it will be noted, reference being had to Figure 4 and Figure 7 that one of the extensions 32 of the finder proper slidably carries a forked member 44 which may be reciprocated by means of a knob 45. The base 30 of the finder carries a pin 46, and this pin is embraced by the arms or prongs of the member 44. The inner edge of one of these embracing arms presents notches 47 of varying depths and thus assuming that the member 44 is retracted or projected it will be obvious that the finder will be tilted to a greater or less extent, and an indicating guide for this tilting might be furnished by the provision of certain marks 48 as in Figure 5, which will enable an operator to adjust the finder with respect to the camera to give an indication of the field which will be presented upon the exposure.

It will be understood that numerous modifications of structure might readily be resorted to without in the least departing from the scope of my claims; which are;

1. A finder including a column, a serrated portion on said column, a plate movable with respect to said column, a gear rotatably carried by said plate and engaging said serrated portion, a finder rockingly carried by said plate and means connecting said gear with said finder for tilting the latter with respect to the plate upon the plate being moved with respect to the column.

2. A finder including a column, a serrated portion on said column, a plate movable with respect to said column, a gear rotatably carried by said plate and engaging said serrated portion, a finder rockingly carried by said plate and a shaft connected to said gear and adapted to be longitudinally moved upon said gear being rotated, said shaft having one of its ends connected to said finder whereby to rock finder with respect to said plate upon said plate being moved with respect to said column.

3. A finder including a column, having a toothed portion, a plate movably carried by said column, a finder rockingly supported by said plate, a gear carried by said plate and engaging said toothed portion, a shaft connected to said gear, and longitudinally movable with respect to said plate, and a finder rockingly carried by said plate, one of the ends of said shaft bearing against said finder whereby upon said plate being moved with respect to said column said finder will be rocked.

4. A finder including a column, having a toothed portion, a plate movably carried by said column, a finder rockingly supported by said plate, a gear carried by said plate and engaging said toothed portion, a shaft connected to said gear and longitudinally movable with respect to said plate, and a screw threaded member carried by said plate, said shaft being formed with screw threads engaging the first named screw threads and being connected to said finder whereby upon said plate being moved with respect to said column said finder will be moved with respect to said plate.

5. A finder body including a plate, a finder movably carried by said plate, a forked member, and a pin, one of each of said elements being connected to said plate and finder, said forked member being formed with notched portions and embracing said pin, whereby upon said member being reciprocated, said finder will be moved with respect to said plate.

6. A finder including a column having a toothed portion, a plate movable longitudinally of said column, cooperating gears one of which is engaged with the toothed portion of said column, a finder body pivotally supported by said plate, and mechanism connecting said gears with said finder body whereby upon said plate being moved along said column the finder body will be rocked about its pivot.

7. A finder including a column, a plate movable longitudinally of said column, a finder body pivotally supported by said plate, a shaft having one end contacting said finder body, and means actuated by a movement of said plate longitudinally of said column for causing said shaft to move said finder body about its pivot.

FREDERICK A. WENMAN.